US007544158B2

(12) United States Patent
Yamada et al.

(10) Patent No.: US 7,544,158 B2
(45) Date of Patent: Jun. 9, 2009

(54) ELECTROCONDUCTIVE RUBBER ROLLER

(75) Inventors: Akihisa Yamada, Ushiku (JP); Masayuki Hashimoto, Kashiwa (JP); Norihiro Harada, Moriya (JP); Mihoko Hyuga, Ushiku (JP)

(73) Assignee: Canon Kasei Kabushiki Kaisha, Ibaraki-ken (JP)

( * ) Notice: Subject to any disclaimer, the term of this patent is extended or adjusted under 35 U.S.C. 154(b) by 598 days.

(21) Appl. No.: 11/401,910

(22) Filed: Apr. 12, 2006

(65) Prior Publication Data

US 2006/0252619 A1 Nov. 9, 2006

(30) Foreign Application Priority Data

May 9, 2005 (JP) ............................. 2005-136315
May 9, 2005 (JP) ............................. 2005-136316

(51) Int. Cl.
*F16C 13/00* (2006.01)
*B21K 1/02* (2006.01)

(52) U.S. Cl. .......................................... 492/56; 492/53

(58) Field of Classification Search ................... 492/56, 492/53; 29/895.32, 895.3
See application file for complete search history.

(56) References Cited

U.S. PATENT DOCUMENTS 5,679,719 A * 10/1997 Klemarczyk et al. .......... 522/13
5,997,456 A * 12/1999 Butters et al. ................. 492/56
6,648,807 B2 * 11/2003 Hashimoto et al. ............ 492/59
6,818,370 B2 * 11/2004 Uchinokura et al. ... 430/108.22
7,070,552 B2 * 7/2006 Mizumoto ................... 492/56
2006/0252620 A1 * 11/2006 Urano et al. ................. 492/56

FOREIGN PATENT DOCUMENTS

JP 2000-063656 2/2000
JP 2006343717 A * 12/2006

* cited by examiner

*Primary Examiner*—Essama Omgba
(74) *Attorney, Agent, or Firm*—Fitzpatrick, Cella, Harper & Scinto

(57) ABSTRACT

An electroconductive rubber roller constituted of an electroconductive metal core and an electroconductive crosslinked rubber layer including an epichlorohydrin-based rubber, wherein the epichlorohydrin-based rubber is at least one copolymer selected from the group consisting of an epichlorohydrin-ethylene oxide copolymer and an epichlorohydrin-ethylene oxide-allyl glycidyl ether ternary copolymer. The ethylene oxide unit in the epichlorohydrin-based rubber is in a content of 40 to 90 mol %, and, the electroconductive crosslinked rubber layer has a heat quantity (enthalpy: ΔH) 5 mJ/mg or less as measured by a differential scanning calorimetry (DSC) and indicated by a peak appearing within a range of −20 to 150° C.

5 Claims, 2 Drawing Sheets

ELECTROCONDUCTIVE RUBBER ROLLER

BACKGROUND OF THE INVENTION

1. Field of the Invention

The present invention relates to an electroconductive rubber roller such as a charging roller, a developing roller or a transfer roller, adapted for use in an image forming apparatus such as an electrophotographic apparatus or an electrostatic recording apparatus, as represented by a copying apparatus, a printer or a facsimile apparatus.

2. Related Background Art

An image forming apparatus of electrophotographic process, such as a copying apparatus or a printer, has employed a process of depositing a toner on an electrostatic latent image and transferring such toner image onto a recording medium such as a transfer paper, thereby obtaining a print. More specifically, a photosensitive member is charged uniformly on its surface and is then exposed to an image projected by an optical system to dissipate the electrostatic charge in an exposed portion to form a latent image. Then, toner is deposited to form a toner image (development), which is then transferred to the recording medium such as a transfer paper to obtain a print.

For uniformly charging the surface of the photosensitive member, there is known a contact charging method of bringing a charging member, to which a voltage (for example 1 to 2 kV) is applied, into contact with the photosensitive member by means of a predetermined pressing force thereby charging the photosensitive member to a predetermined potential. In such method, a charging roller is commonly employed as it can easily realize a uniform contact with the photosensitive member, which is a key factor for achieving a uniform charging in the contact charging method and which can be effected by means of two rotating cylindrical members, in comparison with other contact charging methods such as a brush charging method or a blade charging method.

Such charging roller, for attaining a uniform and satisfactory chargeability in contact with the photosensitive member, is required to have a large and uniform contact area (nip width) in the contact between the charging roller and the photosensitive member. For this purpose, the charging roller is also required to have an appropriate hardness (low hardness). Also the charging roller, being deformed in contact, is required to have a sufficient recovering property against compressive force. On the other hand, in order to apply a necessary bias voltage to the charging roller, the charging roller is required to have a low volume resistivity and has to be regulated so as to be of a desired current value. Also in case the charging roller is electrically not uniform, the charging density on the photosensitive member becomes uneven reflecting such electrical non-uniformity. Therefore, the charging roller is required to have a predetermined resistivity and to be electrically uniform. Thus, various physical properties are required for the charging roller, which comes into direct contact with the photosensitive member.

Furthermore, in the rubber roller employed as the charging roller, its volume resistivity has to be within a predetermined semiconductive range of $1\times10^{5}$ to $1\times10^{10}$ Ω·cm. For realizing such desired electroconductivity, the charging member has been produced by a method of adding and dispersing an electroconductive filler such as carbon black, or a method of selecting rubber having electroconductivity in itself. In the method of adding and dispersing electroconductive filler, the electrical characteristics are influenced even by a small fluctuation in the amount of the filler or a dispersion state and an orientation thereof. Therefore fluctuation in the performance tends to be generated from batch to batch in kneading and from roller to roller even in a same batch. Also the roller obtained in such method shows a significant dependence on the applied voltage, and a stable volume resistivity is difficult to attain. On the other hand, in the method utilizing electroconductive rubber material, such fluctuation is scarcely encountered and the desired electroconductivity can be easily regulated and obtained in stable manner. For this reason, the rollers utilizing electroconductive rubber are recently increasing along with the higher performance required for products.

Such electroconductive rubber can generally be acrylonitrile-butadiene rubber, epichlorohydrin-based rubber or acrylic rubber. Among these, epichlorohydrin-based rubber is known to be a polymer of low electrical resistance.

As the epichlorohydrin-based rubber an epichlorohydrin homopolymer is known. Also there are known an epichlorohydrin-ethylene oxide copolymer, an epichlorohydrin-allyl glydicyl ether copolymer, and an epichlorohydrin-ethylene oxide-allyl glycidyl ether copolymer. Such epichlorohydrin-based rubber has a property that the resistance can be controlled by changing the copolymerizing proportion of ethylene oxide constituting such rubber, and it is already known that the volume resistivity becomes lower as the copolymerizing proportion becomes higher.

However, an epichlorohydrin-based rubber with a high copolymerizing proportion of ethylene oxide, for example employed for preparing an electroconductive rubber roller of a low volume resistivity, is very difficult to provide electroconductive rubber rollers of desired performance in stable manner. This is because in some cases such epichlorohydrin-based rubber, when employed in the preparation of rollers, results in a significant fluctuation in the performance of the rollers from lot to lot, also does not achieve a sufficient reduction in the volume resistivity of the rollers, also results in an unstable rubber hardness of the rollers after vulcanization and may lead to rollers of an abnormally low current value. With a low current value, the roller is difficult to attain a required charging ability, and, when incorporated in an electrophotographic image forming apparatus, is unable to provide a satisfactory image. Also with a high hardness, it is unable to secure a sufficient nip width when in contact with the photosensitive member and it may even cause a damage thereon. These are fatal drawbacks in exhibiting the properties required for the electroconductive rubber roller.

For solving these drawbacks, Japanese Patent Application Laid-open No. 2000-063656 discloses a vulcanizable material including an ether-type copolymer, of which vulcanized substance shows, at 23° C. and 50% RH, a volume resistivity of $1\times10^{5}$ to $2\times10^{7}$ Ω·cm and an environmental dependence of 2.5 or less, for use as a semiconductive material for a low-resistance electroconductive rubber roller.

However, the electroconductive rubber roller prepared with such material, though certainly showing an electroconductivity within the above-indicated range of the resistance value, shows a significant fluctuation in the electroconductivity from lot to lot of material, and is poorly practical as the electroconductive rubber roller for the image forming apparatus.

Also for obtaining an electroconductive rubber roller of an appropriate hardness, a plasticizer is often added to the epichlorohydrin-based rubber. However, when the plasticizer is one ordinarily employed in the epichlorohydrin-based rubber, it may exude out from the electroconductive roller in a prolonged contact with the photosensitive member to cause a local deterioration thereof (stain on photosensitive member), thereby detrimentally affecting the reproduction images.

Therefore, the usable plasticizer has been limited in terms of the type and the blending amount thereof.

SUMMARY OF THE INVENTION

The present invention has been made in consideration of the aforementioned difficulties, and an object thereof is to provide an electroconductive rubber roller that is free from drawbacks such as a deterioration in the electronconductivity or an increase in the hardness, has uniform electrical characteristics and a low hardness, and is excellent in a permanent compression strain resistance.

The present invention provides an electroconductive rubber roller having an electroconductive metal core, and provided thereon, an electroconductive crosslinked rubber layer including an epichlorohydrin-based rubber, wherein the epichlorohydrin-based rubber is at least one copolymer selected from the group consisting of an epichlorohydrin-ethylene oxide copolymer and an epichlorohydrin-ethylene oxide-allyl glycidyl ether ternary copolymer; the ethylene oxide unit in the epichlorohydrin-based rubber is in a content of 40 to 90 mol % based on the epichlorohydrin-based rubber; and the electroconductive crosslinked rubber layer has a heat quantity (enthalpy: ΔH) of 5 mJ/mg or less as measured by a differential scanning calorimetry (DSC) and indicated by a peak appearing within a range of −20 to 150° C.

The present invention allows for obtaining an electroconductive rubber roller having a low electrical resistance and desirable electrical characteristics without deteriorating other characteristics such as electroconductivity or hardness, also having a low hardness and an excellent permanent compression strain resistance.

DETAILED DESCRIPTION OF THE PREFERRED EMBODIMENTS

Figure 1:
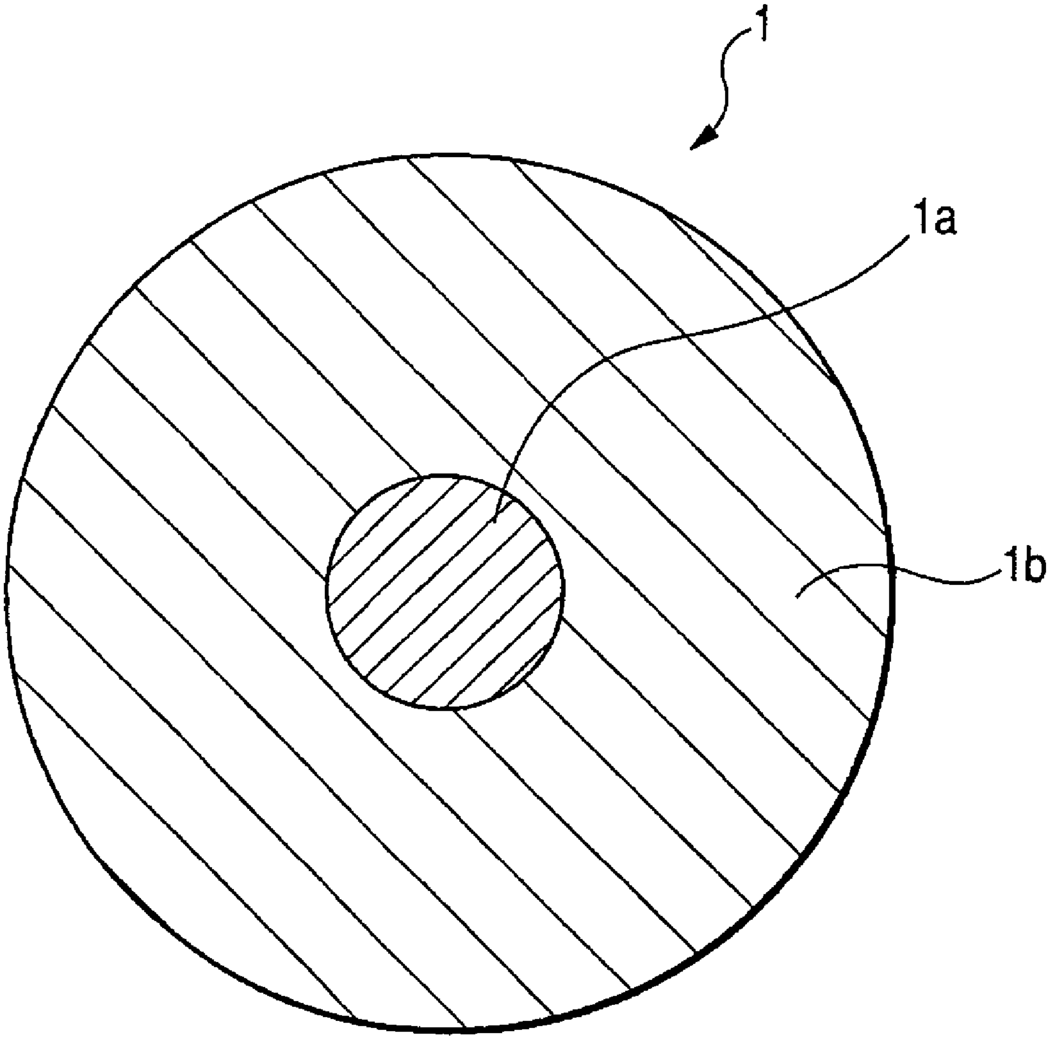
FIG. 1 is a schematic cross-sectional view showing an embodiment of the electroconductive rubber roller of the present invention.

In the following, the present invention will be clarified in detail.

An electroconductive rubber roller of the present invention is constituted of an electroconductive metal core and an electroconductive crosslinked rubber layer including an epichlorohydrin-based rubber and provided on the electroconductive metal core. The epichlorohydrin-based rubber is at least one copolymer selected from the group consisting of an epichlorohydrin-ethylene oxide copolymer and an epichlorohydrin-ethylene oxide-allyl glycidyl ether ternary copolymer. The ethylene oxide unit in the epichlorohydrin-based rubber is in a content of 40 to 90 mol % based on the epichlorohydrin-based rubber. The electroconductive crosslinked rubber layer has a heat quantity (enthalpy: ΔH) of 5 mJ/mg or less as measured by a differential scanning calorimetry (DSC) and indicated by a peak appearing within a range of −20 to 150° C. Such constitution allows for providing an electroconductive rubber roller having a low volume resistivity, a desired current value and an appropriate rubber elasticity. More preferred is an electroconductive rubber roller having an electroconductive crosslinked rubber layer which does not show a peak within a range of −20 to 150° C. in the differential scanning calorimetry (DSC). The DSC characteristics of the electroconductive crosslinked rubber layer are governed by those of the epichlorohydrin-based rubber itself, employed as a raw material of the rubber layer. A fluctuation of the epichlorohydrin-based rubber among production batches thereof induces a heat quantity (enthalpy: ΔH) of 0 to 5 mJ/mg, measured on the crosslinked rubber layer. In case the heat quantity exceeds 5 mJ/mg, the crystallinity derived from an ethylene oxide chain constituting the epichlorohydrin-based rubber presumably affects the physical properties of the crosslinked rubber layer, thus resulting in an abnormally high hardness. Also such crystallinity restricts the freedom of the molecular chain, leading to drawbacks such as an increased volume resistivity and a deteriorated permanent compression strain resistance.

Also in the present invention, the epichlorohydrin-based rubber preferably has a heat quantity (enthalpy: ΔH), measured by a differential scanning calorimetry (DSC) and indicated by a peak appearing within a range of 0 to 70° C., of 15 mJ/mg or less. Use of epichlorohydrin-based rubber within such range allows for providing an electroconductive rubber roller having a low volume resistivity, a desired current value and an appropriate rubber elasticity. More preferably, an epichlorohydrin-based rubber with a heat quantity amount of 12 mJ/mg or less is selected to achieve the lowered volume resistivity and the rubber elasticity in stable manner. On the other hand, in case the heat quantity exceeds 15 mJ/mg, it is not preferable from a practical point of view because the ethylene oxide chain constituting the epichlorohydrin-based rubber presumably becomes crystalline to influence the characteristics of the electroconductive rubber roller, thereby undesirably resulting in a higher volume resistivity and a higher hardness.

In order to obtain an electroconductive crosslinked rubber layer with the aforementioned heat quantity (enthalpy: ΔH) of 15 mJ/mg or less with an epichlorohydrin-based rubber in which the ethylene oxide unit is in a content of 40 to 90 mol %, a synthesizing temperature for the epichlorohydrin-based rubber is suitably regulated. A higher synthesizing temperature tends to provide a larger heat quantity. This is presumably because the polymer chain becomes longer in the course of polymerization and the units constituting the polymer chain become less random, thereby resulting in a block formation (local crystallization) of ethylene oxide portion. Therefore, the ethylene oxide portion influencing the electrical characteristics of the epichlorohydrin-based rubber is restricted in mobility, thereby leading to a lower electroconductivity and a higher hardness. On the other hand, a lower synthesizing temperature induces a slower polymerization reaction to obtain a polymer chain appropriate in length and randomness, thus presumably hindering block formation as explained above and providing excellent electroconductivity and hardness.

The electroconductive crosslinked rubber layer constituting the electroconductive rubber roller of the present invention includes an epichlorohydrin-based rubber. The epichlorohydrin-based rubber includes at least one copolymer selected from the group consisting of an epichlorohydrin-ethylene oxide copolymer and an epichlorohydrin-ethylene oxide-allyl glycidyl ether ternary copolymer. Epichlorohydrin-ethylene oxide-allyl glycidyl ether ternary copolymer is particularly preferable as it is suitable for regulating the volume resistivity. The electroconductive crosslinked rubber layer may include, in addition, a known epichlorohydrin-based compound. Examples of such compound include followings:

epichlorohydrin homopolymer;

epichlorohydrin-ethylene oxide copolymer;

epichlorohydrin-allyl glycidyl ether copolymer; and epichlorohydrin-ethylene oxide-allyl glycidyl ether copolymer.

Among these, a polymer containing ethylene oxide as a constituent unit can easily obtain a relatively low electrical resistance, and can provides a desired resistance value by blending with another polymer. However, in case of a blend, the epichlorohydrin-based rubber preferably constitutes the principal component within an extent not hindering the volume resistivity characteristics of the epichlorohydrin-based rubber. Also the epichlorohydrin-based rubber, contained in the electroconductive crosslinked rubber layer, preferably contains allyl glycidyl ether as a constituent unit. This is because allyl glycidyl ether contains an unsaturated bond, thereby enabling a vulcanization with a sulfur-based vulcanizing agent (sulfur or sulfur-donating compound) and reducing restrictions in the vulcanizing method and in the producing conditions. Also it can improve a thermal softening deterioration resistance and an ozone resistance.

The epichlorohydrin-ethylene oxide-allyl glycidyl ether ternary copolymer is available in various types depending on the copolymerizing proportion, but, in the present invention, ethylene oxide constituent unit in the epichlorohydrin-based rubber accounts for 40 to 90 mol %. An amount of the ethylene oxide constituent unit less than 40 mol % is difficult to attain a desired volume resistivity. On the other hand, an amount exceeding 90 mol % undesirably increases the volume resistivity and the hardness because of crystallization of ethylene oxide. Either case More preferably, the ethylene oxide constituent unit accounts for 65 to 85 mol %. An amount less than 65 mol % may be difficult to achieve a sufficient reduction in resistance intended in the present invention, and an amount exceeding 85 mol % may be unable to completely control the crystallinity, thus being unable to attain the effects of the present invention in stable manner, but both ranges are practically usable by appropriate regulations in the materials and in the formulation.

In the electroconductive rubber roller of the present invention, the epichlorohydrin unit constituting the epichlorohydrin-based rubber is not particularly restricted as long as it is within a range not detrimentally affecting the volume resistivity, hardness and working property. In particular, it is preferably within a range of 8 to 58 mol %, and more preferably 13 to 33 mol %. A smaller amount of the epichlorohydrin constituent unit is unable to hinder crystallization of the ethylene oxide chain, while a larger amount of this constituent unit facilitates crystallization of epichlorohydrin itself, thus both cases leading to a higher volume resistivity and a higher hardness.

In the electroconductive rubber roller of the present invention, the allyl glycidyl ether unit constituting the epichlorohydrin-based rubber is not particularly restricted as long as it is within a range not detrimentally affecting the volume resistivity, hardness and working property. In particular, it is preferably within a range of 2 to 12 mol %. An amount less than 2 mol % may hinder vulcanization with a sulfur-based vulcanizing agent (sulfur or sulfur-donating compound). Also an amount exceeding 12 mol % may induce a hardening deterioration by heat, thus losing rubber elasticity and becoming brittle.

In the electroconductive rubber roller of the present invention, the electroconductive crosslinked rubber layer may contain various rubber materials or polymer materials, in addition to the epichlorohydrin-based rubber as mentioned above. Such rubber material is not particularly restricted as long as it contains the above epichlorohydrin-based rubber as a principal component. For example, it is possible to employ an epichlorohydrin-based rubber singly or a blend thereof with one or more other polymers. Examples of such polymer include ethylene-propylenediene rubber, urethane rubber, acrylonitrile-butadiene rubber, silicone rubber, chloroprene rubber, butadiene rubber, styrene-butadiene rubber, isoprene rubber, natural rubber, butyl rubber and acrylic elastomer.

Also in the electroconductive rubber roller of the present invention, the rubber composition employed in the electroconductive crosslinked rubber layer may suitably contain other additives in addition to the aforementioned components. Examples of such additives include an ionic conductive agent, a vulcanizer, a vulcanization accelerator, a reinforcing agent such as carbon black, a filler, an antiaging agent, and an auxiliary processing agent. The ionic conductive agent is not particularly restricted and can be various salts, for example a metal salt of $Li^+$ or $Na^+$ such as $LiClO_4$, $LiCF_3$, $LiSO_3$, $LiBF_4$, $LiN(CF_3SO_3)_2$ or $NaClO_4$, or following quaternary ammonium salts:

tetraethylammonium perchlorate;
tetrabutylammonium perchlorate;
tetramethylammonium chloride;
tetraethylammonium chloride;
tetrabutylammonium chloride;
tetramethylammonium bromide;
tetrapropylammonium bromide; and
tetramethylammonium iodide.

Such ionic conductive agent may be employed singly or in a combination of two or more kinds.

The vulcanizer is not particularly restricted as long as it is not detrimentally affect the manufacturing process or the image forming apparatus in the use therein. The vulcanizer to be employed for the epichlorohydrin-based rubber can be, in addition to sulfur, an organic peroxide crosslinking agent, a triazine-thiol vulcanizing agent or a 2,3-dimethylquinoxaline vulcanizing agent. The effects of the present invention can be attained by a rubber roller prepared with any vulcanizing method, but the organic peroxide crosslinking agent restricts the manufacturing process as it is difficult to use in the presence of oxygen. In case of vulcanization with triazine-thiol or 2,3-dimethylquinoxaline, an acid-trapping agent is added to the rubber composition in order to prevent a vulcanization inhibition by hydrogen chloride generated at the vulcanization, and such addition may affect the vulcanizing characteristics and the permanent compression strain resistance. Also such vulcanizers, generally showing a quick scorching and a poor storage stability, may cause problems in the manufacturing process. Vulcanization with sulfur is most common in rubber vulcanization and can preferably be used in the cost and in the manufacturing process.

A vulcanization accelerator may also be employed. Such vulcanization accelerator can be those already known for rubber, for example benzothiazoles such as 2-mercaptobenzothiazole or dibenzothiazyl disulfide, sulfeneamides such as N-cyclohexyl-2-benzothiazolyl sulfeneamide or N-tert-butyl-2-benzothiazolyl sulfeneamide, thiurams such as tetraethylthiuram disulfide, tetramethylthiuram monosulfide or dipentamethylenethiuram tetrasulfide, or dithiocarbamate salts. Such accelerator may be employed singly or in a combination or two or more kinds.

In case of employing a reinforcing agent, carbon black of various grades, such as SAF, ISAF, HAF, MAF, FEF, GPF, SRF, FT or MT grade. Also there may be employed electroconductive carbon black such as KETJENBLACK EC-600JD and EC-300J (trade names, manufactured by Ketjenblack International Corp.) or acetylene black, and such reinforcing agent may be employed singly or in a combination or two or more kinds.

The filler can be heavy calcium carbonate, light calcium carbonate, silica, magnesium carbonate or clay, which may be employed singly or in a combination or two or more kinds.

The electroconductive rubber roller may be produced, for example, by a method of utilizing a metal mold, a method of vulcanizing a rubber composition extruded in a tubular form and then pressing it onto a metal core, or a method of covering a metal core with an unvulcanized rubber and then vulcanizing it. The producing method for the electroconductive rubber roller may be selected arbitrarily in consideration of a processing property, a cost, and a dimensional precision and physical and electrical characteristics required as a member for constituting an image forming apparatus. Recently, in consideration of realizing a compact and continuous manufacturing line, the method of covering a metal core with unvulcanized rubber and vulcanizing it is preferred to the method of employing a metal mold or the method of pressing a vulcanized tube onto a metal core.

Method of laminating an electroconductive crosslinked rubber layer on a metal core is not particularly restricted, but a following method is preferable for the purpose of realizing a continuous manufacturing line and reducing the manufacturing cost. In a preferred method, an unvulcanized rubber composition is extruded by an extruder, and simultaneously, metal cores are successively passed through the cross-head die of the extruder thereby positioning the rubber composition on the periphery of the metal core into a roller shape. Another possible method is to extrude an unvulcanized raw material rubber composition into a tubular shape, then to cut it into a predetermined length and to press into it a metal core coated with an adhesive.

The vulcanization may be executed by a known method, such as hot air oven vulcanization, far infrared vulcanization or steam vulcanization. There can also be effectively employed a method of placing an unvulcanized rubber layer, positioned on the periphery of a metal core, in a cavity of a metal mold and executing vulcanization. Also vulcanizing conditions such as time and temperature can be arbitrarily varied without affecting an anticorrosive effect on the metal core or an adhesive force, so that the manufacturing process can be designed freely.

It is also preferable that, on the external periphery of the electroconductive rubber roller, a polyurethane layer is formed by crosslinking at least a polyol with a polyisocyanate. Even in case the blending components mentioned above exude in a small amount from the rubber layer, they can be prevented from exuding through the urethane layer which is formed by crosslinking with polyisocyanate, at the crosslinking of polyol and polyisocyanate on the external periphery of the rubber layer.

As explained in the foregoing, the electroconductive roller of the present invention, capable of attaining a low resistance uniformly and a low hardness, can be particularly preferably employed as a charging roller which is required to uniformly charge the photosensitive member.

EXAMPLES

In the following, the present invention will be described further by examples thereof, but the present invention is not at all limited by such examples, in which "part" means part by mass.

<Preparation of Epichlorohydrin-based Rubber>

Epichlorohydrin-based rubbers of desired composition ratios were obtained by an ordinary solution polymerization, utilizing ethylene oxide, epichlorohydrin and allyl glycidyl ether in monomer compositions shown in Table 1. Also rubbers with different crystallinities were prepared by a temperature control of a heater provided in a polymerization reactor (autoclave), thereby controlling the proceeding of the polymerization reaction.

<Preparation of Rubber Composition>

Following components were kneaded in a closed kneader and open rolls to obtain an unvulcanized rubber composition:

| | |
|---|---|
| Epichlorohydrin-based rubber (A to G) obtained by the above-mentioned method | 100 parts |
| Zinc oxide [trade name: Zinc Oxide Jis2, manufactured by Hakusui Tech Co.] | 5 parts |
| Stearic acid [trade name: stearic acid S, manufactured by Kao Corp.] | 1 part |
| Carbon black [trade name: Asahi #15, manufactured by Asahi Carbon Co.] | 5 parts |
| Calcium carbonate [trade name: Silver W, manufactured by Shiraishi Kogyo Co.] | 40 parts |
| Plasticizer [sebacate polyester, trade name: Polycizer P-202, manufactured by Dai-Nippon Inks and Chemicals Ltd.] | 5 parts |
| Ionic conductive agent [quaternary ammonium salt, trade name: KS-555, manufactured by Kao Corp.] | 2 parts |
| Dibenzothiazyl disulfide [trade name: NOCCELER DM, manufactured by Ouchi Shinko Kagaku Co.] | 1 part |
| Tetramethylthiuram monosulfide [trade name: NOCCELER TS, manufactured by Ouchi Shinko Kagaku Co.] | 1 part |
| Sulfur [trade name: Sulfax 200S, manufactured by Tsurumi Chemical Co.] | 1 part |

>Preparation of Conductive Rubber Roller (Single-layered Roller)>

The unvulcanized rubber composition was extruded by an extruder, and simultaneously metal cores of an external diameter of 6 mm and a length of 250 mm, coated in advance with an adhesive, were continuously passed through a cross-head die to coat the metal core with the unvulcanized rubber. Then the metal core was heated in a hot air oven at 180° C. for 1 hour to obtain an unpolished rubber roller having a crosslinked rubber layer. Then the rubber layers on both ends were peeled off by applying a cutter blade at distances of 10 mm from both ends. Then it was set on a polishing machine mounted with a polishing grindstone GC80 and was polished to an external diameter of 9 mm under polishing conditions of a revolution of 2,000 rpm and a feed rate of 500 m/min. to obtain an electroconductive rubber roller (1) as shown, for example in FIG. 1, in which reference numeral 1 denotes an electroconductive rubber roller, 1*a* an electroconductive core metal, and 1*b* an electroconductive crosslinked rubber layer (epichlorohydrin rubber layer).

<Preparation of Conductive Rubber Roller (Two-layered Charging Roller with a Surfacial Urethane Layer)>

A mixture of following components was subjected to a dispersion, utilizing zirconia beads (average particle size: 0.5 mm) as dispersion medium, by passing a horizontal sand mill three times:

| | |
|---|---|
| ε-caprolactone-modified acrylic polyol solution (diluting solvent: MEK (methyl ethyl ketone), solid content: 20 wt %, hydroxyl value: 50) | 100 parts |
| Electroconductive tin oxide | 20 parts |

The beads were separated by filtration from the dispersion, and hexamethylene diisocyanate (HDI) was added so as to be in OH/NCO=1.0 thereby obtaining a coating liquid for a surface layer.

Figure 2:
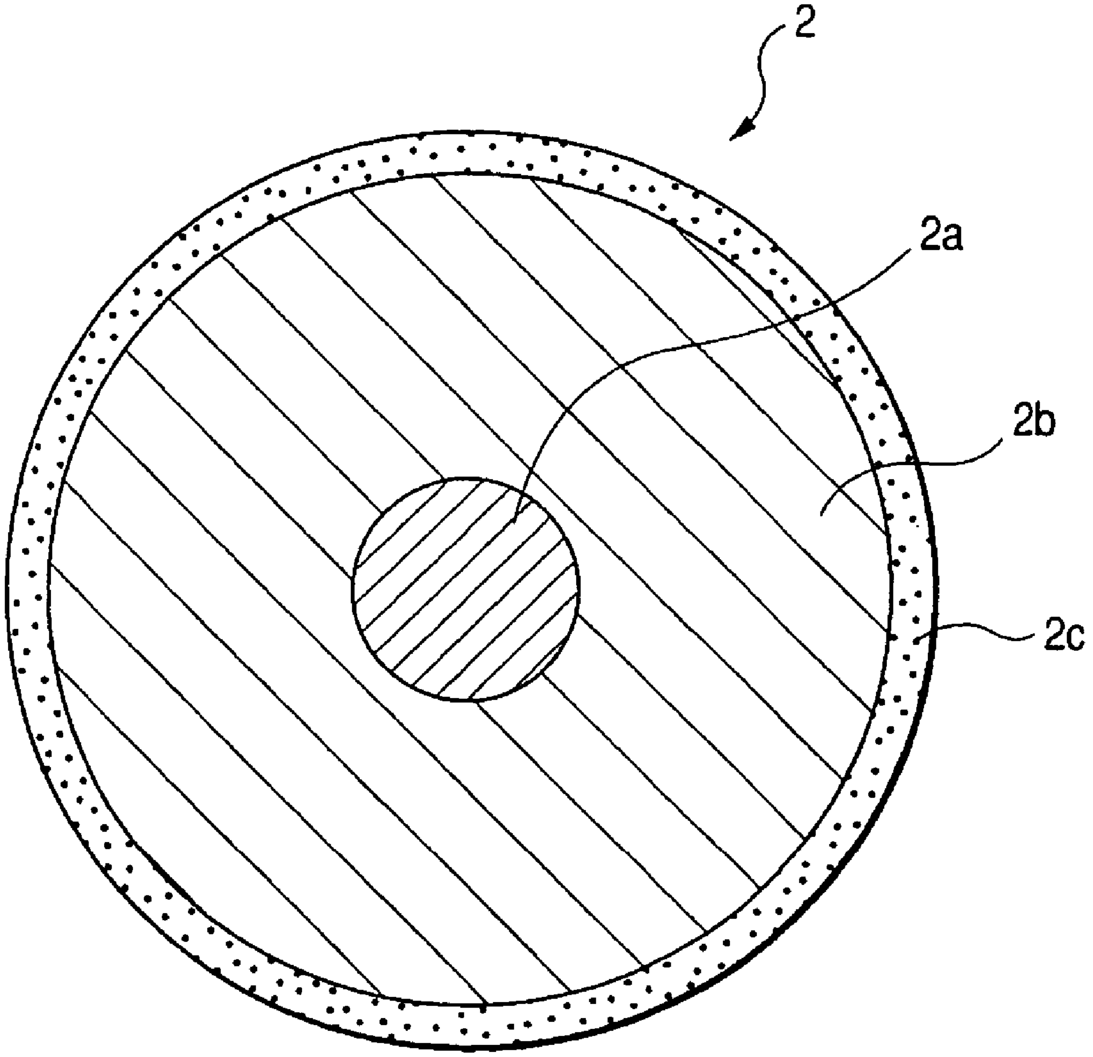
FIG. 2 is a schematic cross-sectional view showing another embodiment of the electroconductive rubber roller of the present invention.

Then the coating liquid for surface layer was dip coated on the electroconductive elastic layer of the electroconductive rubber roller (1) and was dried at 150° C. for 1 hour in a hot-air circulating dryer. After the drying, the surfacial layer (urethane layer) had a thickness of 30 μm. The electroconductive roller thus obtained was designated as electroconductive roller (2) (two-layered charging roller with a surfacial urethane layer: cf. FIG. 2 in which reference numeral 2 denotes electroconductive roller, 2*a* an electroconductive core metal, 2*b* an electroconductive crosslinked rubber layer (epichlorohydrin rubber layer), and 2*c* a surface layer (urethane layer)).

<Measurement/Evaluation>

Physical properties were measured and evaluated in the following manner.

[Differential Scanning Calorimetry (DSC) Measurement of Epichlorohydrin-based Rubber and Electroconductive Crosslinked Rubber Layer]

Heat quantities of epichlorohydrin-based rubber and electroconductive crosslinked rubber layer were calculated, utilizing a differential scanning calorimeter DSC6200 (manufactured by SII Nanotechnology Ltd.), from a peak area obtained by a temperature increase under following conditions:

temperature range: −20° to 150° C.

temperature elevating rate: 10° C./min

[Mooney Viscosity of Unvulcanized Rubber Composition]

Mooney viscosity [ML1+4/100° C.] was measured according to JIS K6300-1995 at 100° C. with an L-shaped rotor.

[Hardness]

Hardness was measured according to JIS K-6253.

[Permanent Compression Strain Rate]

A permanent compression strain rate was measured with a large test piece (diameter: 29 mm, thickness: 12.5 mm) according to JIS K-6262, after standing for 22 hours under conditions of 70° C. and a compression by 25%.

[Electrical Resistance of Electroconductive Rubber Roller (1)]

A resistance of the roller was measured in the following manner. At first the electroconductive rubber roller (1) was let to stand in an environment of 23° C. and 53% RH for 12 hours. Then it was pressed to an aluminum drum of an external diameter of 30 mm under a load of 1 kg in total applied to the shaft of the roller, and a measurement was conducted by applying a voltage of 200 V between the shaft and the aluminum drum.

[Image Evaluation]

The electroconductive rubber roller (2) obtained above was mounted as a charging roller in a process cartridge (the roller being brought into pressure contact with the photosensitive member of 30 mm diameter at the parallel position under a load of 5 N on both ends of the roller). It was then incorporated in an electrophotographic apparatus (Laser Shot LBP-470, manufactured by Canon Corp.) and used for printing, and the obtained image was visually evaluated. The obtained image was rated as A: excellent image, B: image showing certain unevenness but practically acceptable, and C: defective image.

Examples 1 to 4 show results on an electroconductive rubber roller having an epichlorohydrin-based rubber and an electroconductive crosslinked rubber layer as described below:

Epichlorohydrin-based rubber: epichlorohydrin-ethylene oxide-allyl glycidyl ether ternary polymer;

Ethylene oxide unit: 65 to 85 mol %;

Heat quantity of epichlorohydrin-based rubber (peak obtained in a range of 0 to 70° C. in differential scanning calorimetry) 15 mJ/mg or less;

Heat quantity of crosslinked rubber layer of electroconductive rubber roller (peak obtained in a range of −20 to 150° C. in differential scanning calorimetry) 5 mJ/mg or less.

In Examples 1 to 3, the hardness and the electrical characteristics of the electroconductive rubber rollers were excellent, and the obtained image was also excellent without any defect. Example 4 showed a higher hardness and lowered electrical characteristics in comparison with Examples 1 to 3, thus inducing a certain influence on the obtained image, but was practically acceptable sufficiently.

Example 5 shows a result on an electroconductive rubber roller having an epichlorohydrin-based rubber and an electroconductive crosslinked rubber layer as described below:

| | |
|---|---|
| Epichlorohydrin-based rubber: epichlorohydrin-ethylene oxide-allyl glycidyl ether ternary polymer; | 46 mol %; |
| Ethylene oxide unit: | |
| Heat quantity of epichlorohydrin-based rubber (peak obtained in a range of 0 to 70° C. in differential scanning calorimetry) | 15 mJ/mg or less; |
| Heat quantity of crosslinked rubber layer of electroconductive rubber roller (peak obtained in a range of −20 to 150° C. in differential scanning calorimetry) | 5 mJ/mg or less. |

Example 5 showed the smallest roller current value among Examples 1 to 5 because of the lower content of ethylene oxide unit, but showed the lowest hardness and a satisfactory permanent compression strain resistance. It is therefore considered sufficiently usable as long as electrical characteristics, required in the process of the image forming apparatus to be employed, can be satisfied.

Comparative Examples 1 to 2 show results on electroconductive rubber rollers having an epichlorohydrin-based rubber and an electroconductive crosslinked rubber layer as described below:

Epichlorohydrin-based rubber: epichlorohydrin-ethylene oxide-allyl glycidyl ether ternary polymer;

Heat quantity of epichlorohydrin-based rubber (peak obtained in a range of 0 to 70° C. in differential scanning calorimetry): exceeding 15 mJ/mg;

Heat quantity of crosslinked rubber layer of electroconductive rubber roller (peak obtained in a range of −20 to 150° C. in differential scanning calorimetry): exceeding 5 mJ/mg.

Each of Comparative Examples 1 and 2 evidently showed an increase in the hardness and a decrease in the electrical characteristics. Also each, when assembled in a process cartridge and used for image printing, did not provide a satisfactory image, and was evaluated as poor for practical use.

TABLE 1

| | Example | | | | | Comp. Ex. | |
|---|---|---|---|---|---|---|---|
| | 1 | 2 | 3 | 4 | 5 | 1 | 2 |
| epichlorohydrin-based rubber | A | B | C | D | E | F | G |
| mass part | 100 | 100 | 100 | 100 | 100 | 100 | 100 |
| (monomer composition) | | | | | | | |
| ethylene oxide (mol %) | 70 | 72 | 72 | 70 | 46 | 71 | 70 |
| epichlorohydrin (mol %) | 26 | 24 | 24 | 26 | 49 | 25 | 26 |
| allyl glycidyl ether (mol %) | 4 | 4 | 4 | 4 | 5 | 4 | 4 |
| filler etc. mass part | | | | | | | |
| zinc oxide | 5 | 5 | 5 | 5 | 5 | 5 | 5 |
| stearic acid | 1 | 1 | 1 | 1 | 1 | 1 | 1 |
| carbon black | 5 | 5 | 5 | 5 | 5 | 5 | 5 |
| calcium carbonate | 40 | 40 | 40 | 40 | 40 | 40 | 40 |
| plasticizer | 5 | 5 | 5 | 5 | 5 | 5 | 5 |
| ionic conductive agent | 2 | 2 | 2 | 2 | 2 | 2 | 2 |
| vulcanizer mass part | | | | | | | |
| dibenzodiazyl sulfide | 1 | 1 | 1 | 1 | 1 | 1 | 1 |
| tetramethylthiuram monosulfide | 1 | 1 | 1 | 1 | 1 | 1 | 1 |
| sulfur | 1 | 1 | 1 | 1 | 1 | 1 | 1 |
| Results of measurement | | | | | | | |
| DSC on hydrin rubber (mJ/mg) | 2.3 | 6.7 | 11.1 | 14.0 | 0.0 | 15.8 | 24.0 |
| DSC on crosslinked rubber layer (mJ/mg) | 0.0 | 1.2 | 3.1 | 4.4 | 0.0 | 6.2 | 8.9 |
| Mooney viscosity ($ML_{1+4}$) | 48.1 | 49.4 | 47.8 | 45.5 | 41.5 | 42.7 | 39.8 |
| hardness (JIS A) | 54 | 54 | 56 | 60 | 45 | 66 | 74 |
| permanent compression strain rate (%) | 24.0 | 24.8 | 24.5 | 24.5 | 23.7 | 25.0 | 24.7 |
| roller current (μA) | 4100 | 3800 | 3500 | 3100 | 820 | 2400 | 1600 |
| image evaluation | A | A | A | B | B | C | C |

This application claims priority from Japanese Patent Application Nos. 2005-136315 filed May 9, 2005, and 2005-136316 filed May 9, 2005, which are hereby incorporated by reference herein.

What is claimed is:

1. An electroconductive rubber roller comprising:

an electroconductive metal core; and an electroconductive crosslinked rubber layer including an epichlorohydrin-based rubber and provided on the electroconductive metal core;

wherein the epichlorohydrin-based rubber is at least one copolymer selected from the group consisting of an epichlorohydrin-ethylene oxide copolymer and an epichlorohydrin-ethylene oxide-allyl glycidyl ether ternary copolymer;

the ethylene oxide unit in the epichlorohydrin-based rubber is in a content of 40 to 90 mol % based on the epichlorohydrin-based rubber; and the electroconductive crosslinked rubber layer has a heat quantity (enthalpy: DH) of 5 mJ/mg or less as measured by a differential scanning calorimetry (DSC) and indicated by a peak appearing within a range of −20 to 150° C.

2. An electroconductive rubber roller according to claim 1, wherein the epichlorohydrin-based rubber has a heat quantity (enthalpy: DH) of 15 mJ/mg or less as measured by a differential scanning calorimetry (DSC) and indicated by a peak appearing within a range of 0 to 70° C.

3. An electroconductive rubber roller according to claim 2, wherein said heat quantity of the epichlorohydrin-based rubber is 12 mJ/mg or less.

4. An electroconductive rubber roller according to claim 1, wherein the epichlorohydrin-based rubber is an epichlorohydrin-ethylene oxide-allyl glycidyl ether ternary copolymer; and the ethylene oxide unit in the epichlorohydrin-ethylene oxide-allyl glycidyl ether ternary copolymer is in a content of 65 to 85 mol %.

5. An electroconductive rubber roller according to claim 1, wherein the electroconductive rubber roller is a charging roller.

* * * * *